United States Patent [19]

Bly

[11] Patent Number: 4,515,443
[45] Date of Patent: May 7, 1985

[54] PASSIVE OPTICAL SYSTEM FOR BACKGROUND SUPPRESSION IN STARRING IMAGERS

[75] Inventor: Vincent T. Bly, Alexandria, Va.

[73] Assignee: The United States of America as represented by the Secretary of the Army, Washington, D.C.

[21] Appl. No.: 454,305

[22] Filed: Dec. 29, 1982

[51] Int. Cl.³ ............................................. G02B 27/28
[52] U.S. Cl. .................................... 350/396; 350/407
[58] Field of Search ...................... 350/388, 396, 407; 358/225, 232, 284; 340/791, 793; 355/71

[56] References Cited

U.S. PATENT DOCUMENTS

| 2,516,905 | 8/1950 | Osterberg et al. | 350/407 |
| 2,911,468 | 11/1959 | Pourciau | 358/225 |
| 4,237,481 | 12/1980 | Aughton | 358/284 |
| 4,299,451 | 11/1981 | Task et al. | 350/407 |

FOREIGN PATENT DOCUMENTS 2010631  6/1979  United Kingdom ................ 358/225

OTHER PUBLICATIONS

Streiffert, J. G., "A System of Double Noise Reduction for Variable-Area Recording for Direct-Playback Purposes", Jr. of the SMDTE, vol. 57, 10—1951, pp. 316-318.

Primary Examiner—William H. Punter
Attorney, Agent, or Firm—Anthony T. Lane; Robert P. Gibson; Max L. Harwell

[57] ABSTRACT

A dual focus objective lens and opposite linear polarizers associated therewith for providing a linearly polarized image at a first focal image plane and an opposite linearly polarized image at a second focal plane. A detector array is positioned at the first focal image plane which is closest to the objective lens. Each pixel site of the detector array has two halves with opposite polarities in each half wherein each half looks at opposite planes of polarization in the two image planes. One plane of polarization receives a focused linearly polarized image of the high spatial frequency target and low spatial frequency background and the other plane of polarization receives a slightly defocused image which contains a defocused image of the high spatial frequency target but a rather faithful reproduction of the low spatial frequency background. The two outputs from each half of the pixel sites are algebraically subtracted by processing electronics leaving a high contrast target image.

19 Claims, 4 Drawing Figures

PASSIVE OPTICAL SYSTEM FOR BACKGROUND SUPPRESSION IN STARRING IMAGERS

The invention described herein may be manufactured, used, and licensed by the U.S. Government for governmental purposes without the payment of any royalties thereon.

BACKGROUND OF THE INVENTION

1. Field of the Invention

The invention is in the field of image enhancement and more specifically in a system of using polarized focused and defocused images of the same optical scene in real time for background suppression and target image enhancement.

2. Description of the Prior Art

In virtually all forward looking infrared imagers (FLIRS) or visible spectrum imagers, a detector array is scanned across the thermal image, allowing the background to be suppressed by a.c. coupling of the detectors. Interest is presently increasing in the concept of a staring, i.e. non-scanning, imager because of the reduction of moving parts and the increased potential sensitivity afforded by the larger number of detectors that may be used. It is in the staring imagers that low contrast becomes an important limitation, many instances occur where a scene is made up of many high spatial frequency targets and overall uniform low spatial frequency background. This is true of IR and visible light scenes in the presence of fog, smoke, or haze. In scenes of this type, the limits of observation are usually set by the low contrast. The present invention helps solve the low constrast problem.

SUMMARY OF THE INVENTION

The invention is comprised of dual focus objective lens and polarizing means for providing a linearly polarized image in a first focal image plane and an opposite linearly polarized image in a second focal image plane. Associated with the dual focus objective lens is a detector array positioned in the first focal image plane, which is closest to said objective lens. Each pixel site of the detector array is defined as a detector pair because each detector preferably has a dichroic polarizer in front thereof which has two halves with opposite polarities in each half wherein each half of the dichroic polarizer looks at the opposite planes of polarization of the images in first and second focal image planes. The detector array receives a focused linearly polarized image of a high spatial frequency target and low spatial frequency background in the first focal image plane and a defocused opposite linearly polarized image passing therethrough to the second focal image plane which contains a blurred image of the high spatial frequency target but a rather faithful reproduction of the low spatial frequency background the same as in the focused image.

The invention is further comprised of a difference sensing means for sensing the focused and defocused images at each pixel site to provide output signals proportional to the difference between the opposite linearly polarized focused and defocused images. This difference sensing may be done in space or in time. The sensing in space is by the above explained dichroic polarizers. The sensing in time may be by placing a polarizing chopper between the dual focus objective lens and the detector plane array on the first focal image plane for alternately transmitting the linearly polarized image and the opposite linearly polarized image. The polarizing chopper may be an electro-optically rotatable chopper of the Kerr Cell or Pockel's Cell types, or could be a slower mechanically rotatable type plane polarizing filter.

The output signals proportional to the difference between said focused and unfocused opposite linearly polarized images are electronically processed to algebraically subtract the backgrounds and produce an enhanced contrast target signal for the staring array imager. For the sensing in time, an a.c. amplifier may amplify the output signals from the detector, using a passband centered at the polarizing chopper frequency. Any target signal produced at this frequency will be due to the difference in the very rapid focused and defocused images caused by the optical effects of the chopper wherein each detector alternately looks at the focused image and the defocused image.

Two specific dual focus objective lens are envisioned. One such lens is a Cooke-Triplet refractive system with an undersized negative lens element and plane polarizers mounted on an aperture plane. Another such lens is a back-surface mirror of the Mangin type with a reflective wire grid type linear polarizer on the front surface.

The technical principle of the invention is known as unsharp masking where contrast is increased by the low spatial frequency background being algebraically subtracted from the target plus background of an overall scene. The principle of unsharp masking has been implemented by photographic means where a final print is made from a combination of a focused sharp image of a scene, i.e. target plus background, and a defocused image corresponding to the background only. The defocused image eliminates only the high spatial frequency target since only the higher spatial frequencies are out of focus. Thus, when the defocused image is algebraically subtrated from the focused image the backgrounds subtract out while the sharp focused high spatial frequency features of the target remain. The photographic application is not in real time. The present invention implements unsharp masking in real time.

DETAILED DESCRIPTION OF THE PREFERRED EMBODIMENT

Figure 1:
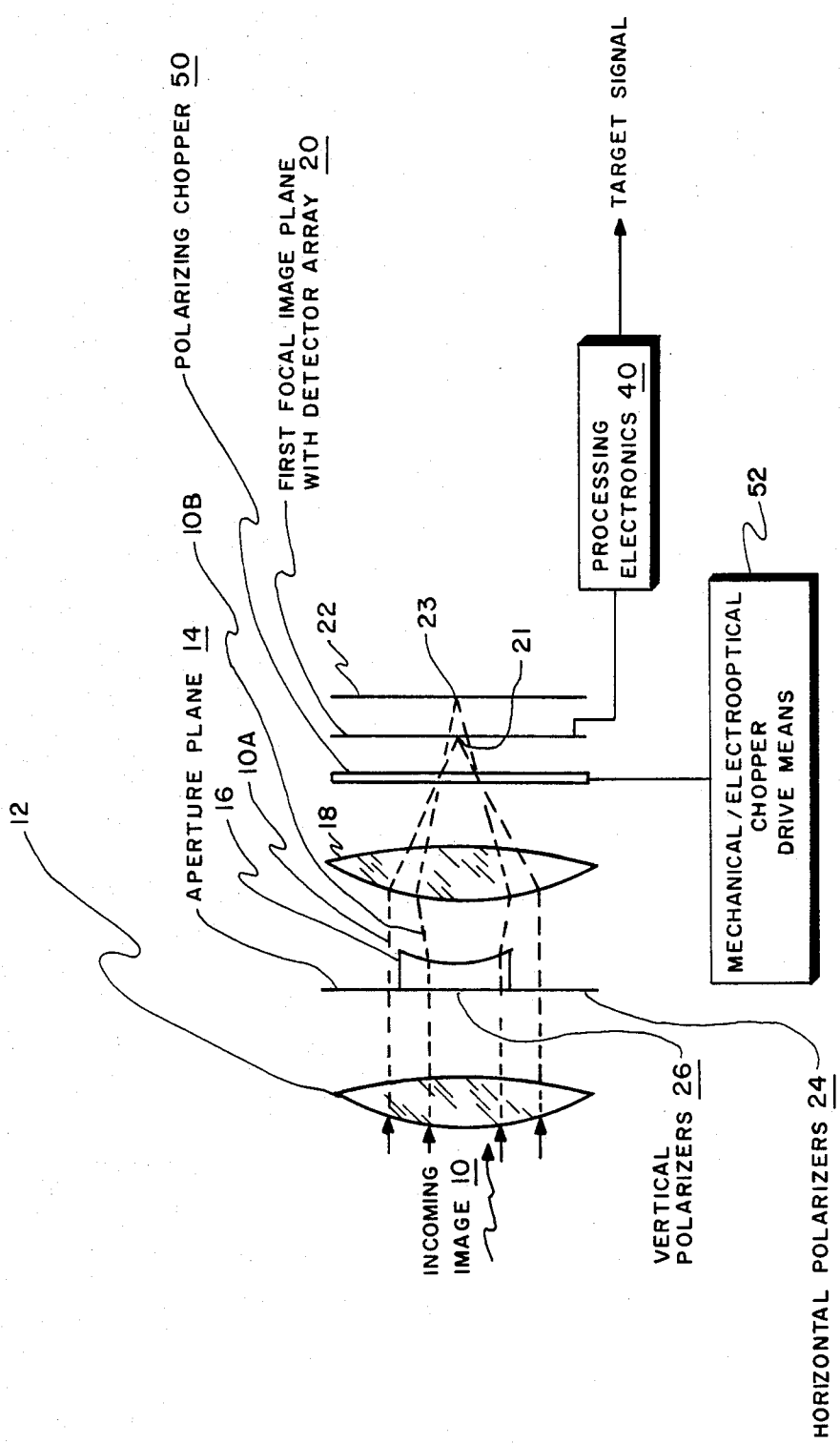
FIG. 1 is a schematic drawing of the refractive system of the invention.

FIG. 1 illustrates the arrangement, not to scale, of the Cooke-Triplet refractive system used for background suppression. Image radiation 10 is shown entering the first positive lens 12. An optically centered negative lens 16 is positioned on an aperture plane 14 between the first positive lens 12 and the second positive lens 18. The negative lens 16 is undersized so that the outer portion of the image 10, represented as 10A, does not pass through the negative lens 16 while the innermost portion of the image, represented as 10B, passes through lens 16. The portion of plane 14 through which image 10A passes is horizontally polarized by polarizers 24 and the portion through which image 10B passes is vertically polarized by polarizers 26. The polarization may however be interchanged.

Image rediation 10A, not under the influence of lens 16, is focused at focal plane 20 at point 21. Image radiation 10B, which is extended along the optical axis by negative lens 16, is focused at focal plane 22 at point 23. A detector array is positioned on focal plane 20 and has processing electronics 40 at the output thereof for processing algebraic subtraction of image 10B, which even though is focused at plane 22 is defocused at plane 20, from image 10A, which is focused at plane 20. This is the space like difference sensing. In the time like difference sensing, the polarizing chopper 50 is appropriately driven by chopper drive means 52 to alternately apply the focused and defocused images on the detectors of the detector array. Processing electronics 40 also performs algebraic subtraction in time like difference sensing.

Figure 2:
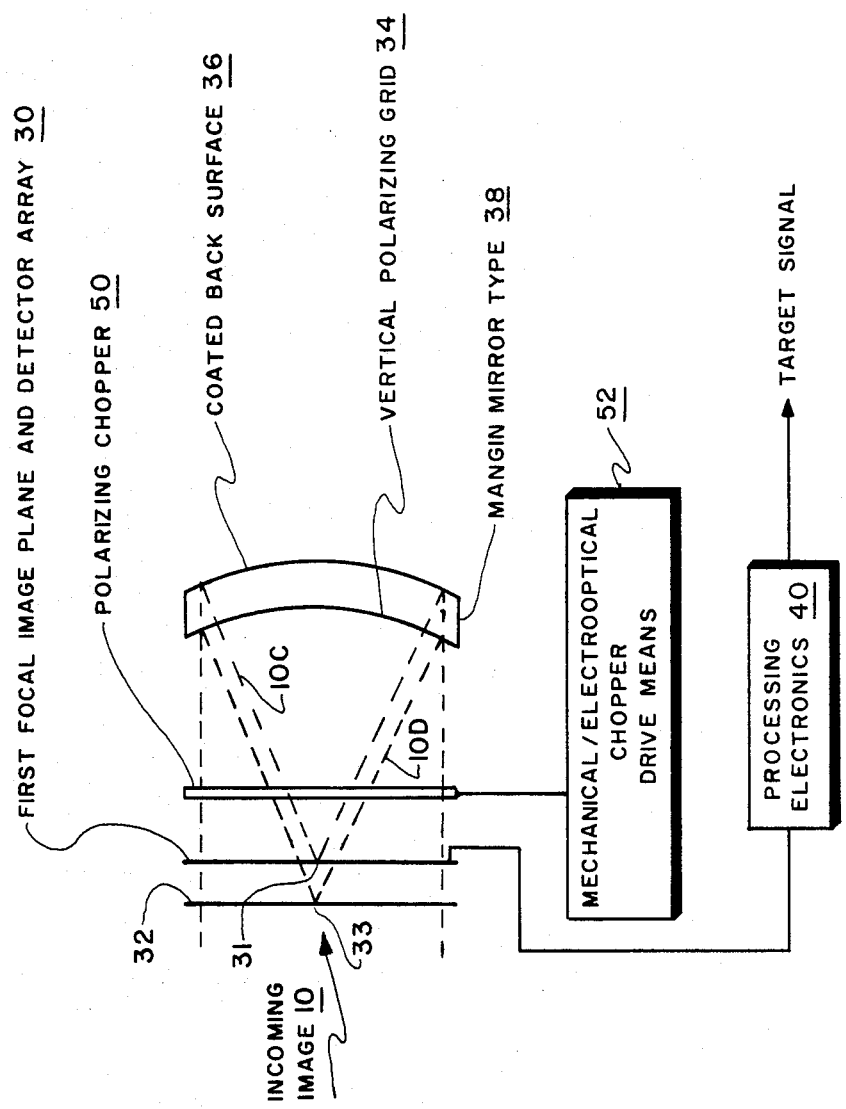
FIG. 2 is a schematic drawing of the reflective system of the invention.

FIG. 2 illustrates the back-surface Mangin mirror 38 system having a vertically polarizing reflective wire grid 34 type polarizer on the front surface and a coated back surface 36, preferably aluminized. The incoming image 10 enters the system through second and first focal image planes 32 and 30, and passes through the polarizing chopper 50 to reflect off front surface grid 34 as vertically polarized image, represented by numeral 10D, and off the aluminized back surface 36 as horizontally polarized image, represented by numeral 10C. The horizontally polarized image 10C is in focus in the detector array in the first focal image plane 30. The processing electronics 40, polarizing chopper 50, and the chopper drive means 52 all operate the same as in the embodiment of FIG. 1.

Figure 3:
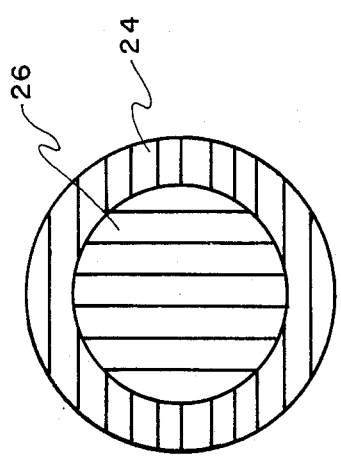
FIG. 3 illustrates the polarizing means of the refractive system.

FIG. 3 shows the polarizers 24 and 26 as explained with relation to the aperture plane 14 and negative lens 16 of FIG. 1. For proper operation, the areas of 24 and 26 are the same, i.e. the diameter of 26 is 0.701 of the diameter of 24.

Figure 4:
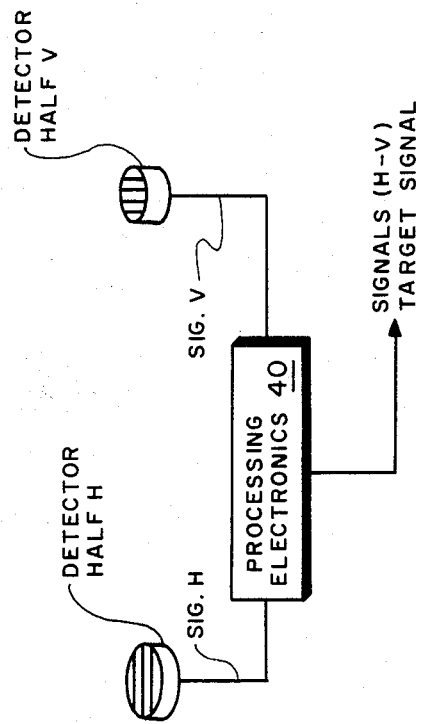
FIG. 4 shows schematically the outputs of each detector of a detector pair.

FIG. 4 illustrates a pixel detector pair where the dichroic polarizer provides a detector half H and a detector half V wherein the respective difference signals H and V are applied to the processing electronics 40 for subtraction of the defocused vertically polarized image V from the focused horizontally polarized image H. The specific processing electronics depends on the particular detector type used in each half H and V and the method of read-out. One simple process would be to use two photodiodes with opposite electrical polarity. Their combined outputs are proportional to the difference of the individual outputs of the two photodiodes. An a.c. amplifier may amplify the detector outputs using a passband centered at the polarizing chopper frequency.

The foregoing detailed description is illustrative of the invention, and it is to be understood that other embodiments thereof will be obvious to those skilled in the art. The embodiments described herein together with those additional embodiments are considered to be within the scope of the invention.

I claim:

1. A passive optical system for background suppression in staring array imagers, said system comprising:
   a dual focus objective lens and polarizing means for providing a linearly polarized image in a first focal image plane and an opposite linearly polarized image in a second focal image plane;
   a detector array positioned in said first focal image plane closest to said objective lens for receiving a sharp focused linearly polarized image of a high spatial frequency feature target and low spatial frequency background therein and an unsharp defocused opposite linearly polarized image in said second focal image plane which contains a blurred image of said high spatial frequency feature target and an image that contains a faithful reproduction of said low spatial frequency background as in said sharp focused linearly polarized image in said first focal image plane, said focused and defocused images received in each pixel site of said detector array;
   difference sensing means for sensing said focused and defocused images at each pixel site to provide output signals proportional to the difference between said focused and defocused opposite linearly polarized images; and
   means for electronically processing said output signals from each of said pixel sites to algebraically subtract said backgrounds and produce an enhanced contrast target signal for said staring array imager.

2. A system as set forth in claim 1 wherein said dual focus objective lens and polarizing means is comprised of two positive lens on each side of an optically centered undersized negative lens element of a Cooke-Triplet refractive system wherein said undersized negative lens element is mounted on an aperture plane with vertical polarizing means on portion of said aperture plane contiguous with said negative lens element and horizontal polarizing means on the outer portion of said aperture plane wherein image passing through said negative lens element is focused in said second focal image plane and image passing through said outer portion of aperture plate is focused in said first focal image plane.

3. A system as set forth in claim 1 wherein said dual focus objective lens and polarizing means is comprised of a Mangin type back-surface mirror having a vertically polarizing reflective wire grid type linear polarizer on the front surface for reflecting the vertically polarized image and a reflective back surface for reflecting the remaining horizontally polarized image therefrom wherein said horizontally polarized image is focused in said first focal image plane and said vertically polarized image is focused in said second focal image plane.

4. A system as set forth in claim 2 wherein said difference sensing means is comprised of space like difference sensing wherein each pixel site is further comprised of dichroic polarizers positioned in front of each detector with opposite polarities in each half of each dichroic polarizer wherein said dichroic polarizers separately allow linearly polarized light therethrough as a focused linearly polarized image to one half thereof and as a defocused opposite linearly polarized image to the other half wherein each detector has said output signals proportional to the difference between the focused and defocused images.

5. A system as set forth in claim 3 wherein said difference sensing means is comprised of space like difference sensing wherein each pixel site is further comprised of dichroic polarizers positioned in front of each detector with opposite polarities in each half of each dichroic polarizer wherein said dichroic polarizers separately allow linearly polarized light therethrough as a focused linearly polarized image to one half thereof and as a defocused opposite linearly polarized image to the other half wherein each detector has said output signals proportional to the difference between the focused and defocused images.

6. A system as set forth in claim 4 wherein means for electronically processing said output signals is comprised of two photodiodes with opposite electrical polarity wherein the combined outputs are proportional to the difference of the two photodiodes outputs.

7. A system as set forth in claim 5 wherein means for electronically processing said output signals is comprised of two photodiodes with opposite electrical polarity wherein the combined outputs are proportional to the difference of the two photodiodes outputs.

8. A system as set forth in claim 2 wherein said difference sensing means is comprised of time like difference sensing wherein a polarizing chopper is placed in the optical path between said dual focus objective lens and said detector plane array in said first focal image plane wherein said chopper alternately transmits said linearly polarized image and said opposite linearly polarized image.

9. A system as set forth in claim 3 wherein said difference sensing means is comprised of time like difference sensing wherein a polarizing chopper is placed in the optical path between said dual focus objective lens and said detector plan array is said first focal image plane wherein said chopper alternately transmits said linearly polarized image and said opposite linearly polarized image.

10. A system as set forth in claim 8 wherein said polarizing chopper is a mechanically rotatable polarizing filter.

11. A system as set forth in claim 9 wherein said polarizing chopper is a mechanically rotatable polarizing filter.

12. A system as set forth in claim 8 wherein said polarizing chopper is an electro-optically rotatable chopper.

13. A system as set forth in claim 9 wherein said polarizing chopper is an electro-optically rotatable chopper.

14. A system as set forth in claim 12 wherein said chopper is a Kerr Cell.

15. A system as set forth in claim 13 wherein said chopper is a Kerr Cell.

16. A system as set forth in claim 12 wherein said chopper is a Pockel's cell.

17. A system as set forth in claim 13 wherein said chopper is a Pockel's cell.

18. A system as set forth in claim 12 wherein said means for electronically processing said output signals is by a.c. amplifying using a passband centered at the frequency of said polarizing chopper.

19. A system as set forth in claim 13 wherein said means for electronically processing said output signals is by a.c. amplifying using a passband centered at the frequency of said polarizing chopper.

* * * * *